US008654973B2

(12) United States Patent
Bhogal et al.

(10) Patent No.: US 8,654,973 B2
(45) Date of Patent: Feb. 18, 2014

(54) METHOD, SYSTEM, AND PROGRAM PRODUCT FOR ENCRYPTING PORTIONS OF A DOCUMENT USING SELECTIVE ANNOTATION

(75) Inventors: Kulvir S. Bhogal, Fort Worth, TX (US); Gregory J. Boss, American Fork, UT (US); Rick A. Hamilton, II, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 2207 days.

(21) Appl. No.: 11/562,471

(22) Filed: Nov. 22, 2006

(65) Prior Publication Data

US 2008/0118064 A1    May 22, 2008

(51) Int. Cl.
*H04N 1/44*        (2006.01)
(52) U.S. Cl.
USPC ............... 380/243; 726/28; 380/51; 382/188; 715/230
(58) Field of Classification Search
USPC ........ 726/28; 380/51, 243; 382/188; 715/230
See application file for complete search history.

(56) References Cited

U.S. PATENT DOCUMENTS

| | | | |
|---|---|---|---|
| 5,832,474 A | 11/1998 | Lopresti et al. | |
| 6,054,990 A | 4/2000 | Tran | |
| 6,671,684 B1 | 12/2003 | Hull et al. | |
| 6,681,045 B1 * | 1/2004 | Lapstun et al. | ............... 382/187 |
| 6,836,555 B2 | 12/2004 | Ericson et al. | |
| 7,350,236 B1 * | 3/2008 | Silverbrook et al. | ............ 726/26 |
| 7,397,468 B2 * | 7/2008 | Braun et al. | ................... 345/179 |
| 2002/0034300 A1 | 3/2002 | Thuvesholmen et al. | |
| 2002/0035687 A1 | 3/2002 | Skantze | |
| 2002/0126105 A1 * | 9/2002 | O'Donnell, Jr. | ............... 345/179 |
| 2003/0187886 A1 | 10/2003 | Hull et al. | |
| 2004/0201602 A1 | 10/2004 | Mody et al. | |
| 2004/0252888 A1 * | 12/2004 | Bargeron et al. | ............. 382/188 |
| 2006/0007189 A1 * | 1/2006 | Gaines et al. | ................. 345/179 |
| 2006/0294599 A1 * | 12/2006 | Sim et al. | ......................... 726/34 |
| 2008/0235282 A1 * | 9/2008 | Ericson et al. | ............. 707/104.1 |

FOREIGN PATENT DOCUMENTS

JP        2004280519 A       10/2004

OTHER PUBLICATIONS

Persiano et al., "User Privacy Issues Regarding Certificates and the TLS Protocol", 2000, pp. 53-62, ACM, CCS, Greece.
Janssen et al., "UpLib: A Universal Personal Digital Library System", 2003, pp. 234-242, ACM, DocEng, France.
Esler et al., "Next Century Challenges: Data-Centric Networking for Invisible Computing", 1999, pp. 256-262, ACM, Mobicom, Seattle Washington.

* cited by examiner

*Primary Examiner* — Amare F Tabor
(74) *Attorney, Agent, or Firm* — Lisa Ulrich; Hoffman Warnick LLC

(57) ABSTRACT

The invention provides a method, system, and program product for encrypting portions of a document using selective annotation. One method according to the invention includes: defining an annotation border adjacent a portion of a document using a digital pen; applying to the portion of the document an annotation verb specifying that the portion of the document is to be encrypted; entering into the portion of the document information to be encrypted; and encrypting the portion of the document.

21 Claims, 5 Drawing Sheets

METHOD, SYSTEM, AND PROGRAM PRODUCT FOR ENCRYPTING PORTIONS OF A DOCUMENT USING SELECTIVE ANNOTATION

FIELD OF THE INVENTION

The invention relates generally to encryption techniques, and more particularly, to a method, system, and program product for encrypting portions of a document using selective annotation.

BACKGROUND OF THE INVENTION

Digital pens and related technologies have been gaining popularity due to their convenience and versatility. One of the advantages provided by digital pens is the ability to store handwritten information in the pen itself, eliminating the need to collect, transport, and/or store individual pieces of paper upon which such information may be written.

However, it may often be the case that the author of a document prepared using a digital pen wishes to share only portions of the document with another individual. Currently, the author would need to edit the document in order to remove or obscure the portions of the document he/she does not wish to share. In some cases, the author may wish to share different portions of the document with different individuals. It may even be the case that the author wishes to share a particular portion of the document with two or more individuals, but not with all of the individuals with whom the document will be shared. In such cases, the author currently has to prepare a number of versions of the document in order to ensure that only the proper portions of the document are shared with each of the individuals. This is a quite unsatisfactory solution, as it requires a great deal of time and effort on the part of the author and leaves open the possibility that the author will accidentally share with an individual a version of the document containing portions that the individual was not meant to see.

Accordingly, there exists a need in the art to overcome the deficiencies and limitations described hereinabove.

SUMMARY OF THE INVENTION

The invention provides a method, system, and program product for encrypting portions of a document using selective annotation. In one embodiment, the invention includes: defining an annotation border adjacent a portion of a document using a digital pen; applying to the portion of the document an annotation verb, wherein the annotation verb specifies whether the portion of the document is to be encrypted; entering into the portion of the document information to be encrypted; and in the case that the annotation verb specifies that the portion of the document is to be encrypted, encrypting the portion of the document.

A first aspect of the invention provides a method for encrypting a portion of a document written with a digital pen, the method comprising: defining an annotation border adjacent a portion of a document using a digital pen; applying to the portion of the document an annotation verb, wherein the annotation verb specifies whether the portion of the document is to be encrypted; in the case that the annotation verb specifies that the portion of the document is to be encrypted, encrypting the portion of the document.

A second aspect of the invention provides a system for encrypting a portion of a document written with a digital pen, the system comprising: a system for defining an annotation border adjacent a portion of a document using a digital pen; a system for applying to the portion of the document an annotation verb, wherein the annotation verb specifies whether the portion of the document is to be encrypted; and a system for encrypting the portion of the document.

A third aspect of the invention provides a program product stored on a computer-readable medium, which when executed, encrypts a portion of a document written with a digital pen, the program product comprising: program code for defining an annotation border adjacent a portion of a document using a digital pen; program code for applying to the portion of the document an annotation verb, wherein the annotation verb specifies whether the portion of the document is to be encrypted; and program code for encrypting the portion of the document.

A fourth aspect of the invention provides a method for deploying an application for encrypting a portion of a document written with a digital pen, comprising: providing a computer infrastructure being operable to: define an annotation border adjacent a portion of a document using a digital pen; apply to the portion of the document an annotation verb, wherein the annotation verb specifies whether the portion of the document is to be encrypted; and in the case that the annotation verb specifies that the portion of the document is to be encrypted, encrypt the portion of the document.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a method, system, and program product for encrypting portions of a document using selective annotation.

Figure 1:
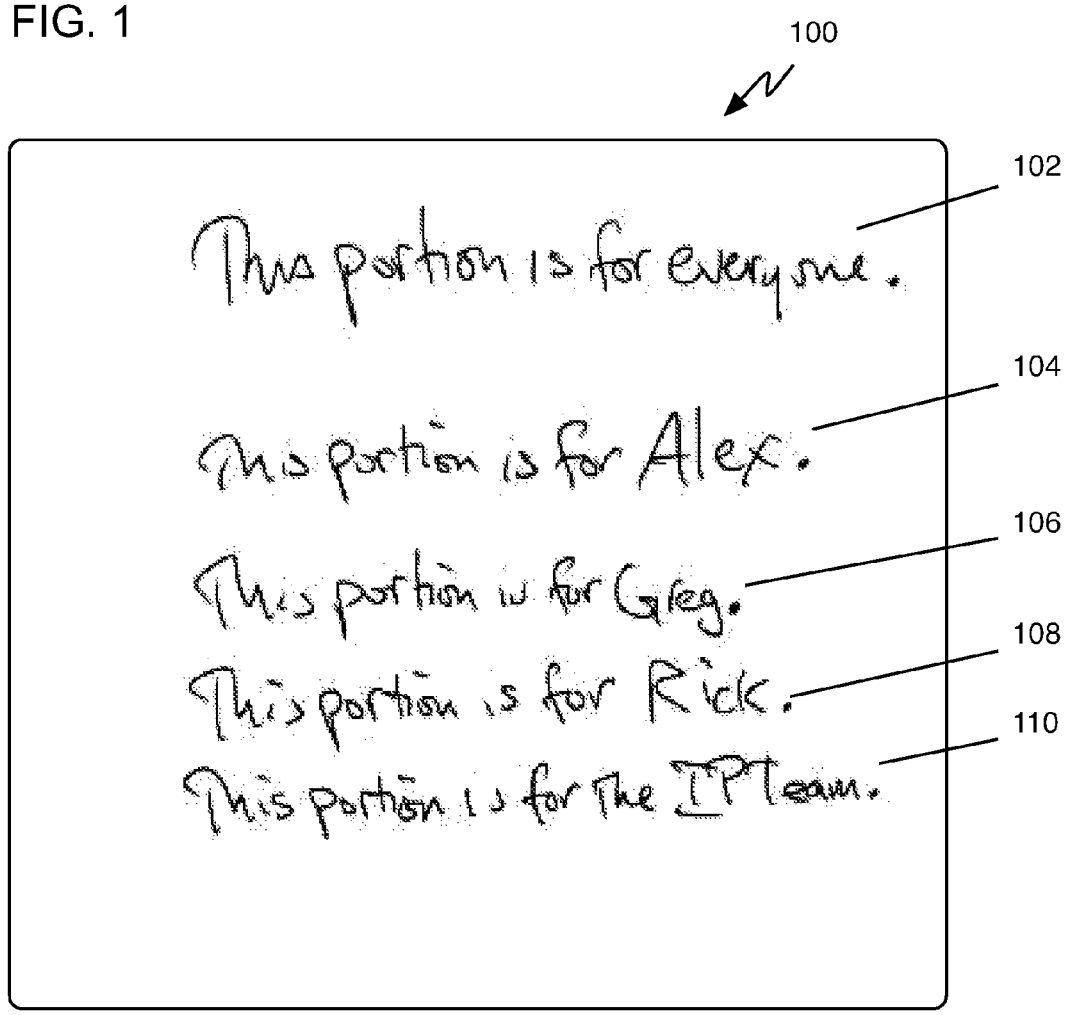
FIGS. 1-3 show views of a document at various stages of selective annotation according to the invention.

Referring now to the drawings, FIG. 1 shows a document 100 written using a digital pen. As shown, document 100 includes a number of portions 102 . . . 110 that the author may wish to either share or hide from another individual.

Figure 2:
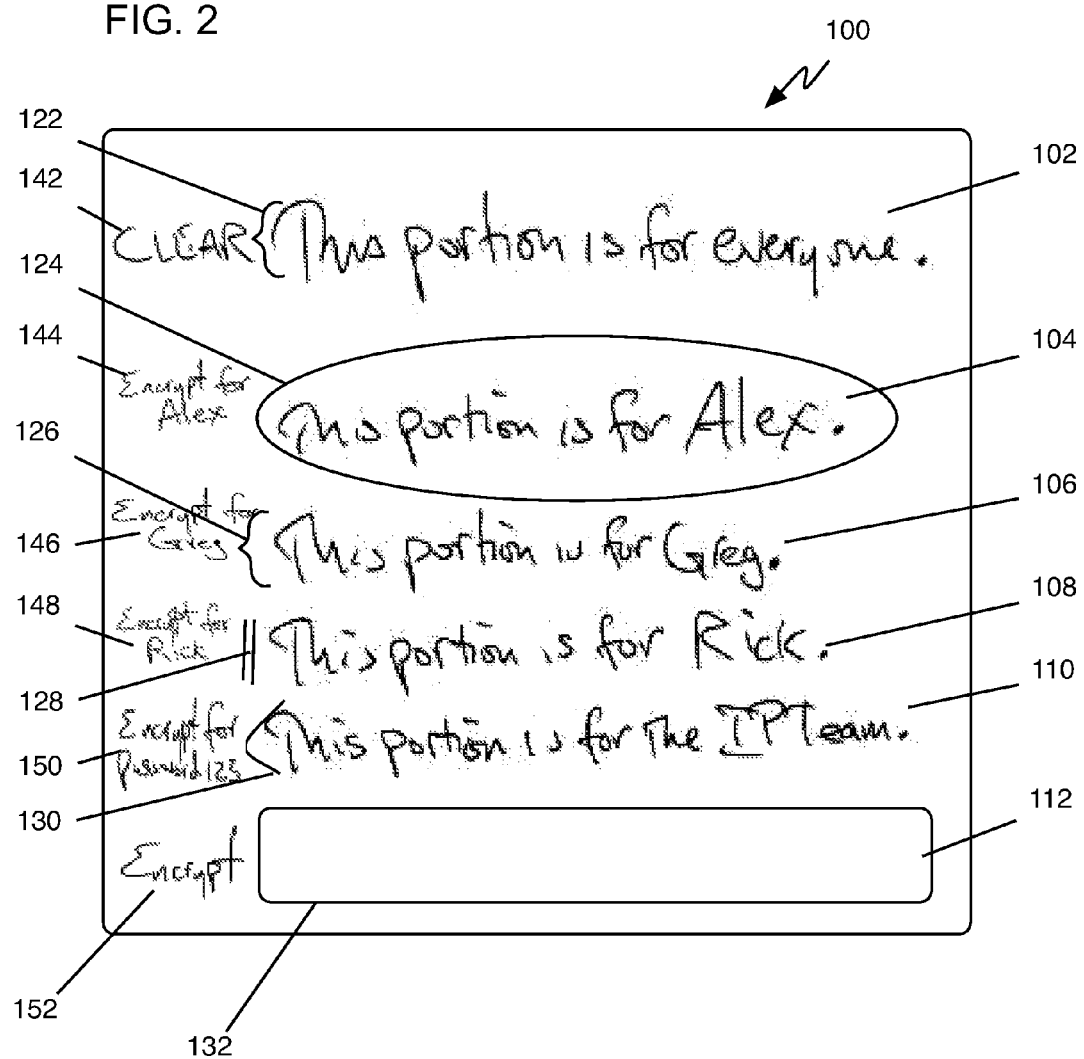

FIG. 2 shows document 100 following its selective annotation. To document 100 has been added a number of annotation borders 122 . . . 132 and annotation verbs 142 . . . 152. An annotation border is a graphical mechanism for defining a portion of document 100. For example, portions 102 and 106 are each defined using an annotation border 122, 126 comprising a curved bracket. Portion 104 is defined using an ovoid annotation border 124, portion 108 using a double-line annotation border 128, portion 110 using an angled bracket annotation border 130, and portion 112 (which does not yet include any information, as will be described in greater detail below) using a rectangular annotation border 132. Other shapes or styles of annotation borders may be used, of course, as will be recognized by one skilled in the art.

Once each portion 102 . . . 112 of document 100 has been defined using an annotation border 122 . . . 132, an annotation verb 142 . . . 152 may be applied to one or more portion. An annotation verb is a mechanism for specifying whether and how the portion to which it is applied will be encrypted. For example, in FIG. 2, portion 102, which is intended to be shared with everyone, has had applied to it a "CLEAR" annotation verb 142, indicating that portion 102 is not to be encrypted. Other annotation verbs for indicating that a portion is to be unencrypted (e.g., "UNENCRYPT," "OPEN," etc.) may also be used, as will be recognized by one skilled in the art. Optionally, any portion of document 100 that has not had an annotation verb applied to it may, by default, be left unencrypted.

Still referring to FIG. 2, other portions 104 . . . 112 of document 100 have had applied to them various annotation verbs 144 . . . 152. Portion 104, intended to be shared only with Alex, has had applied to it an "ENCRYPT FOR ALEX" annotation verb 144. Similarly, portion 106, intended to be shared only with Greg, has had applied to it an "ENCRYPT FOR GREG" annotation verb 146; portion 108, intended to be shared only with Rick, has had applied to it an "ENCRYPT FOR RICK" annotation verb 148; and portion 110, intended to be shared only with members of the intellectual property (IT) team, has had applied to it an "ENCRYPT FOR PASSWORD 123" annotation verb 150. As can be seen, then, annotation verbs may specify encryption for an individual or group of individuals. In the case of portion 110, which has had applied to it the "ENCRYPT FOR PASSWORD 123" annotation verb 150, only members knowing the password (i.e., "123") will be able to view portion 110 once encrypted. Each member of the IP team, therefore, is presumed to know the password applied in the annotation verb 150.

While the annotation verbs described above specify encryption for a particular individual or group, annotation verbs may also simply specify that the portions to which they are applied are to be encrypted. For example, portion 112, which has been defined by annotation border 132, has had applied to it an "ENCRYPT" annotation verb 152. In such a case, information within portion 112 will be encrypted according to the encryption techniques or protocols specified by the author. In most cases, then, portion 112 will be encrypted for use by the author only.

Figure 3:
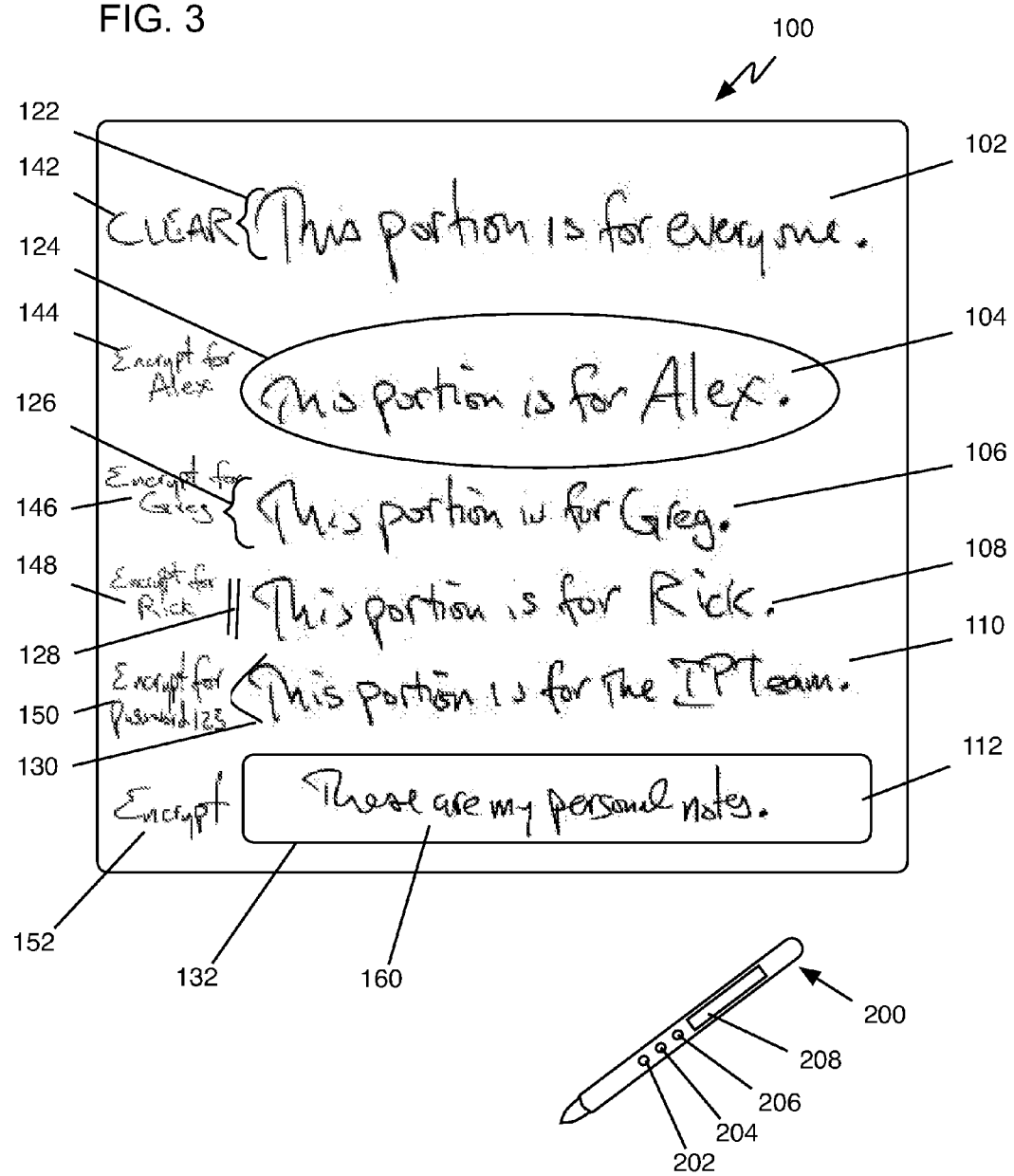

As can be seen in FIG. 2, portion 112, defined by annotation border 132, does not yet include any information to be encrypted. However, it may be desirable to predefine such a portion 112 where the author knows that he/she will later enter information he/she wishes to encrypt. In FIG. 3, for example, it can be seen that the author has now entered information 160 into portion 112.

In an alternative embodiment of the invention, rather than writing an annotation verb 142 . . . 152 into document 100 using a digital pen, a name and/or public key of an individual or group stored in the digital pen may be selected by the author. For example, still referring to FIG. 3, digital pen 200 may include one or more toggles 202, 204, 206 or similar devices for selecting a name and/or public key stored in the digital pen 200. Digital pen 200 may also include, for example, a display 208, such as a liquid crystal display (LCD), for displaying the name and/or public key to the author.

Alternatively, toggles 202, 204, 206 or similar devices may be used to mark start and end points at which information 160, an annotation border 132, or an annotation verb 152 are entered using the digital pen 200.

In practicing the present invention, any known or later-developed encryption technology or technique may be used in practicing the present invention. In addition, encryption performed while practicing the present invention may be performed using the digital pen 200 or a separate computing device (not shown) to which document 100 or a portion thereof (102 . . . 112) stored on the digital pen 200 is transferred.

Figure 4:
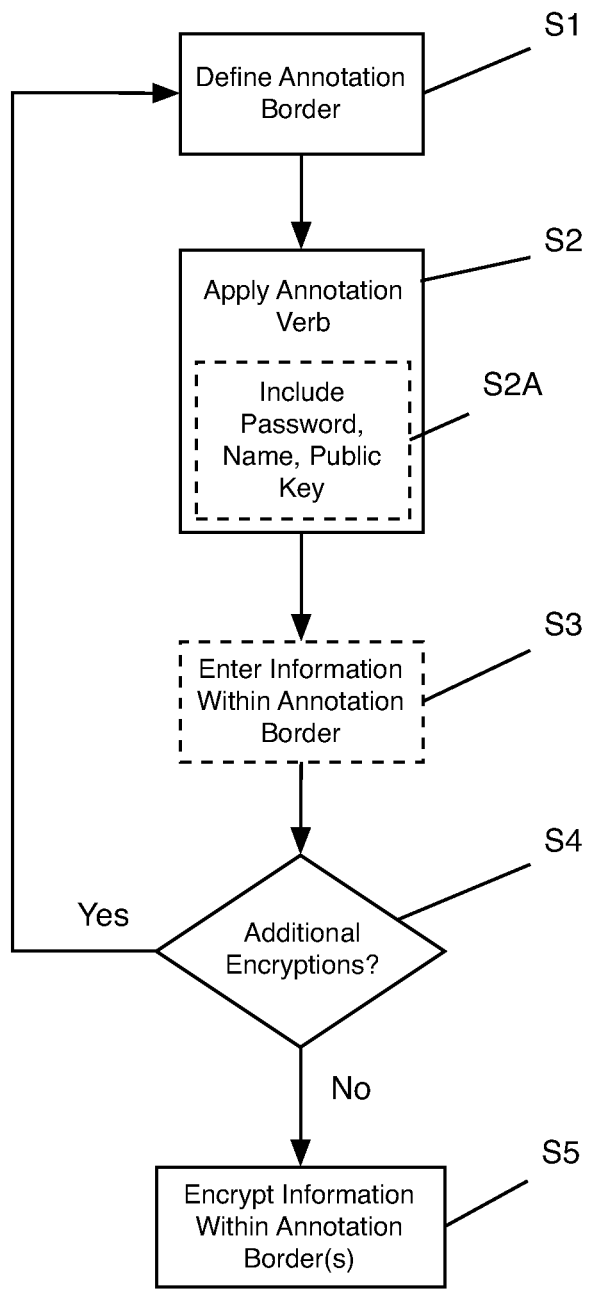
FIG. 4 shows a flow diagram of an illustrative method according to the invention.

Referring now to FIG. 4, a flow diagram of an illustrative method according to the invention is shown and will be described with reference to FIGS. 1-3. At step S1, an author defines an annotation border 122 within a document 100 prepared using a digital pen 200. Next, at step S2, the author applies an annotation verb 142 to the annotation border 122 defined at step S1. At step S2A, the author may optionally include within the annotation verb 142 a password, name, and/or public key. As noted above, in one embodiment of the invention, a name and/or public key is selected, using a toggle 202, 204, 206 or similar device on the digital pen 200, from among those stored on the digital pen 200. It should be recognized that a password stored on the digital pen 200 may similarly be selected for inclusion in the annotation verb 142 at step S2A.

At optional step S3, in the case that the portion 102 of document 100 defined by annotation border 122 at step S1 did not already include information to be encrypted, or should the author wish to add additional information to this portion 102, he/she may enter such information within annotation border 142 at step S3.

At step S4, it is determined whether additional portions of document 100 are to be encrypted. If so (i.e., "Yes" at step S4), steps S1 through S3 may be iteratively looped until all additional portions 104 . . . 112 have been defined by an annotation border 124 . . . 132 and have had an annotation verb 144 . . . 152 applied to them.

Finally, at step S5, information within the annotation borders 122 . . . 132 is encrypted according to the annotation verbs 142 . . . 152 and any default or specified techniques or protocols defined by the author. As explained above, encryption at step S5 may take place within digital pen 200 or may be performed on or using a separate computing device (not shown).

Figure 5:
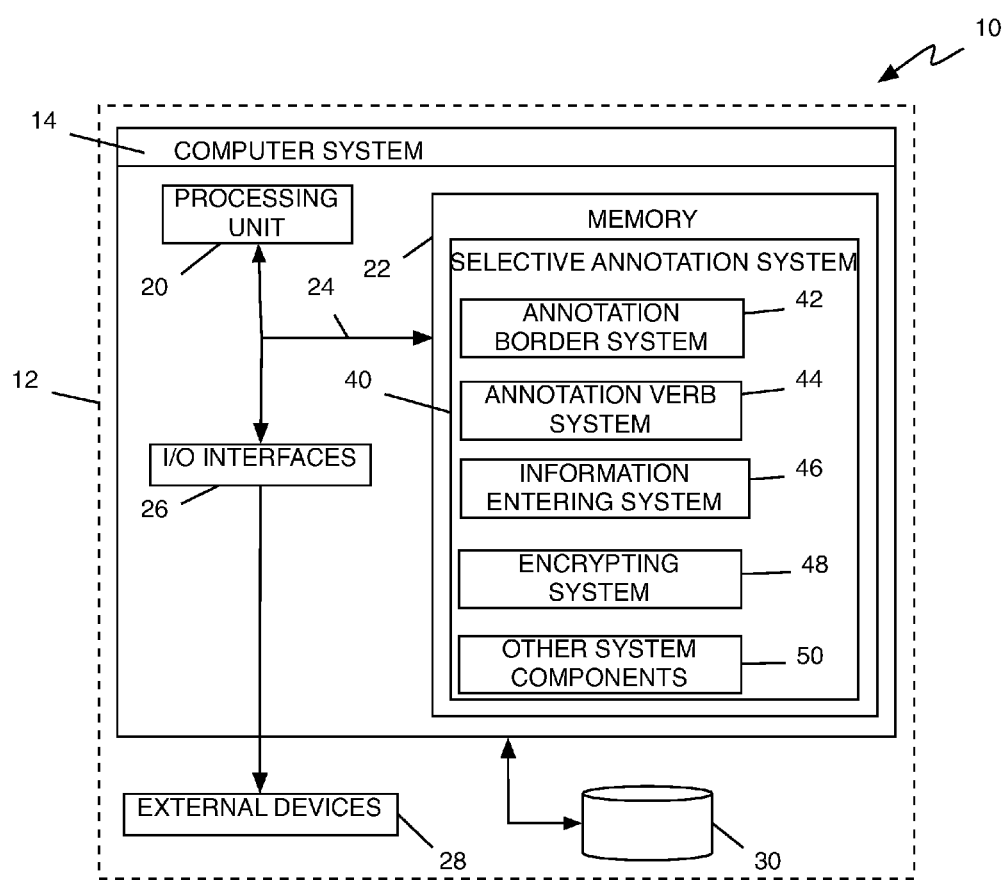
FIG. 5 shows a block diagram of an illustrative system according to the invention.

FIG. 5 shows a block diagram of an illustrative system 10 for encrypting a portion of a document using selective annotation. To this extent, system 10 includes a computer infrastructure 12 that can perform the various process steps described herein for encrypting a portion of a document using selective annotation. In particular, computer infrastructure 12 is shown including a computer system 14 that comprises a selective annotation system 40, which enables computer system 14 to encrypt a portion of a document using selective annotation by performing the process steps of the invention.

Computer system 14 is shown including a processing unit 20, a memory 22, an input/output (I/O) interface 26, and a bus 24. Further, computer system 14 is shown in communication with external devices 28 and a storage system 30. As is known in the art, in general, processing unit 20 executes computer program code, such as selective annotation system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and selective annotation system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, selective annotation system 40 enables computer system 14 to encrypt a portion of a document using selective annotation. To this extent, selective annotation system 40 is shown including an annotation border system 42, an annotation verb system 44, an information entering system 46, and an encrypting system 48. Operation of each of these systems is discussed above. Selective annotation system 40 may further include other system components 50 to provide additional or improved functionality to selective annotation system 40. It is understood that some of the various systems shown in FIG. 5 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for encrypting a portion of a document using selective annotation, it is understood that the invention further provides various alternative embodiments. For example, in one embodiment, the invention provides a computer-readable medium that includes computer program code to enable a computer infrastructure to encrypt a portion of a document using selective annotation. To this extent, the computer-readable medium includes program code, such as selective annotation system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to encrypt a portion of a document using selective annotation as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for encrypting a portion of a document using selective annotation. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for encrypting a portion of a document written with a digital pen, the method comprising:
    defining an annotation border adjacent a first portion of a document using a digital pen;
    applying to the first portion of the document an annotation verb, wherein the annotation verb specifies whether the first portion of the document is to be encrypted; and
    in the case that the annotation verb specifies that the first portion of the document is to be encrypted, encrypting the first portion of the document without encrypting a second portion of the document.

2. The method of claim 1, wherein the applying includes entering the annotation verb using the digital pen.

3. The method of claim 1, wherein the annotation verb specifies that the first portion of the document is to be encrypted for at least one of the following: an individual or a group of individuals.

4. The method of claim 3, wherein the applying includes selecting a public key of the individual or the group of individuals stored in the digital pen.

5. The method of claim 1, wherein the annotation verb includes a password.

6. The method of claim 1, wherein the encrypting the first portion of the document is performed using the digital pen.

7. The method of claim 1, further comprising:
entering into the first portion of the document information to be encrypted.

8. The method of claim 1, further comprising:
defining an additional annotation border adjacent the second portion of the document using the digital pen;
applying to the second portion of the document an additional annotation verb, wherein the additional annotation verb specifies whether the second portion of the document is to be encrypted; and
in the case that the additional annotation verb specifies that the second portion of the document is to be encrypted, encrypting the second portion of the document.

9. A system for encrypting a portion of a document written with a digital pen, the system comprising:
a system for defining an annotation border adjacent a first portion of a document using a digital pen;
a system for applying to the first portion of the document an annotation verb, wherein the annotation verb specifies whether the first portion of the document is to be encrypted; and
a system for encrypting the first portion of the document without encrypting a second portion of the document.

10. The system of claim 9, wherein the system for applying includes a system for entering the annotation verb using the digital pen.

11. The system of claim 9, wherein the annotation verb specifies that the first portion of the document is to be encrypted for at least one of the following: an individual or a group of individuals.

12. The system of claim 11, wherein the system for applying includes a system for selecting a public key of the individual or group of individuals stored in the digital pen.

13. The system of claim 9, wherein the annotation verb includes a password.

14. The system of claim 9, further comprising:
a system for entering into the first portion of the document information to be encrypted.

15. A program product stored on a computer-readable medium, which when executed, encrypts a portion of a document written with a digital pen, the program product comprising:
program code for defining an annotation border adjacent a first portion of a document using a digital pen;
program code for applying to the first portion of the document an annotation verb, wherein the annotation verb specifies whether the first portion of the document is to be encrypted; and
program code for encrypting the first portion of the document without encrypting a second portion of the document.

16. The program product of claim 15, wherein the program code for applying includes program code for entering the annotation verb using the digital pen.

17. The program product of claim 15, wherein the annotation verb specifies that the first portion of the document is to be encrypted for at least one of the following: an individual or a group of individuals.

18. The program product of claim 17, wherein the program code for applying includes program code for selecting a public key of the individual or group of individuals stored in the digital pen.

19. The program product of claim 15, wherein the annotation verb includes a password.

20. A method for deploying an application for encrypting a portion of a document written with a digital pen, comprising:
providing a computer infrastructure being operable to:
define an annotation border adjacent a first portion of a document using a digital pen;
apply to the first portion of the document an annotation verb, wherein the annotation verb specifies whether the first portion of the document is to be encrypted; and
encrypt the first portion of the document without encrypting a second portion of the document.

21. The method of claim 8, wherein:
the annotation verb specifies that the first portion of the document is to be encrypted for at least one of the following: an individual and a group of individuals;
the additional annotation verb specifies that the second portion of the document is to be encrypted for at least one of the following: an individual or a group of individuals; and
the individual and/or group of individuals for whom the first portion of the document is to be encrypted is different than the individual and/or group of individuals for whom the second portion of the document is to be encrypted.

* * * * *